March 27, 1934.  DE WITT C. THOMAS  1,952,149
ROTARY INTERNAL COMBUSTION ENGINE
Filed Jan. 15, 1930   10 Sheets-Sheet 3
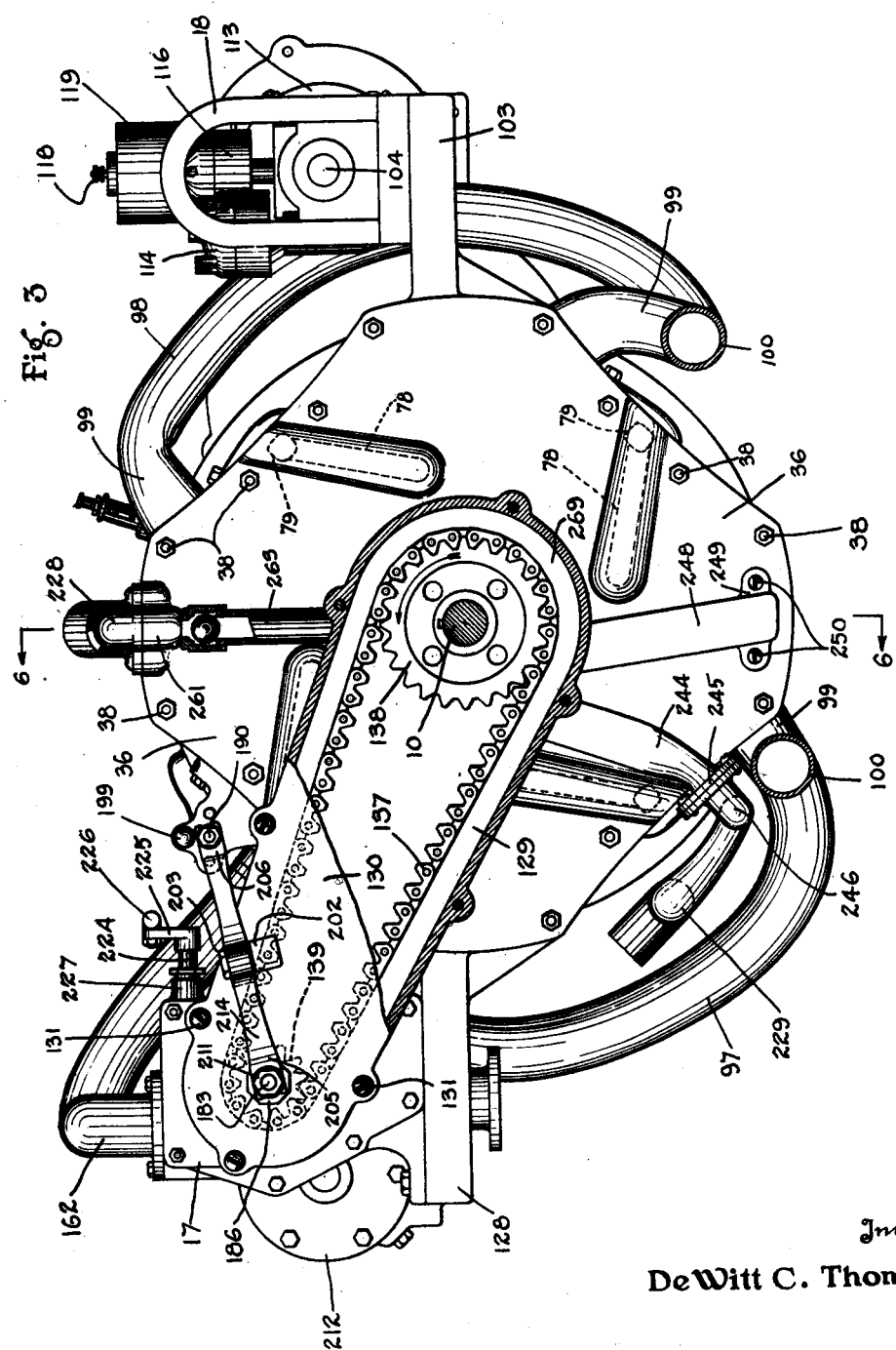
Inventor
DeWitt C. Thomas

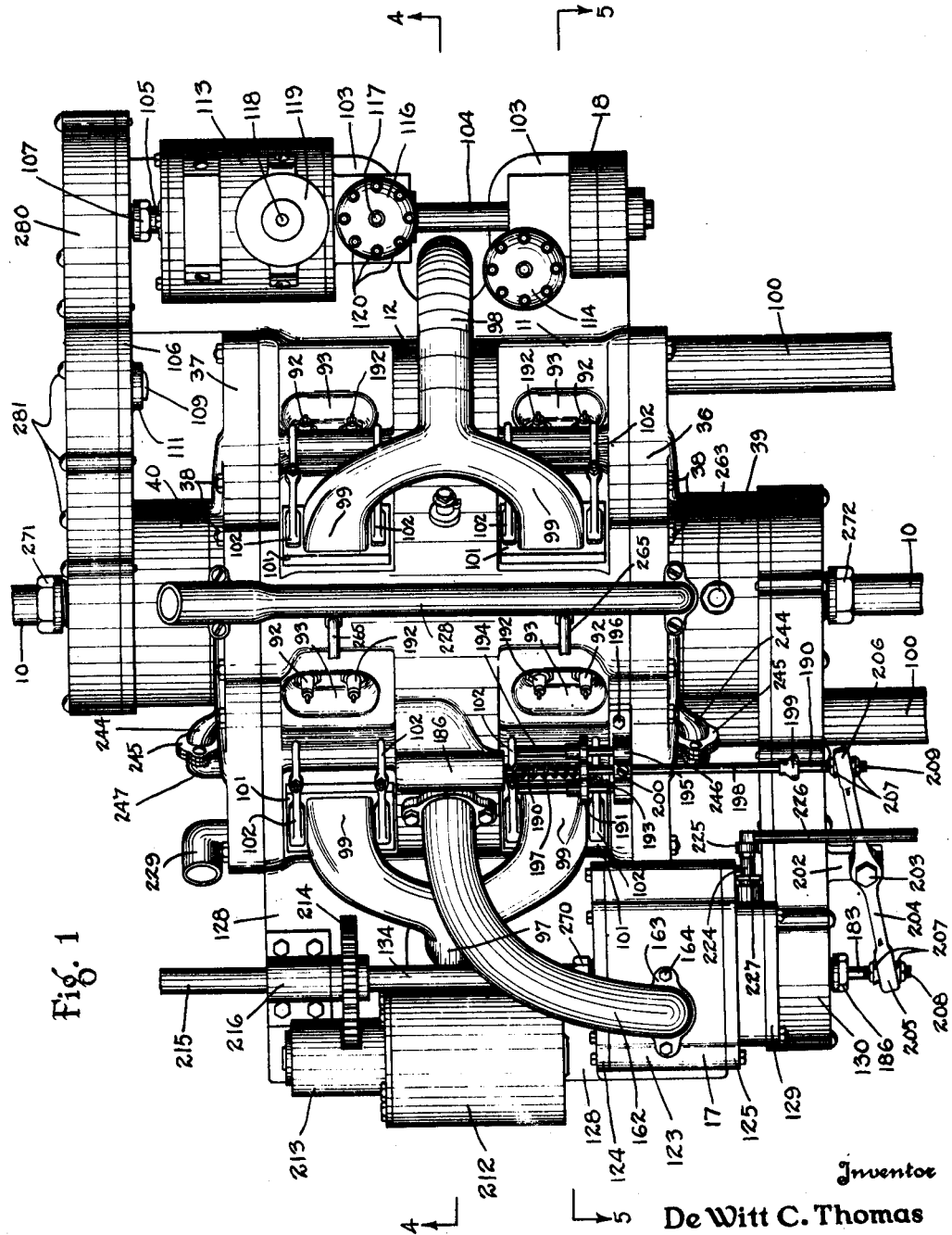

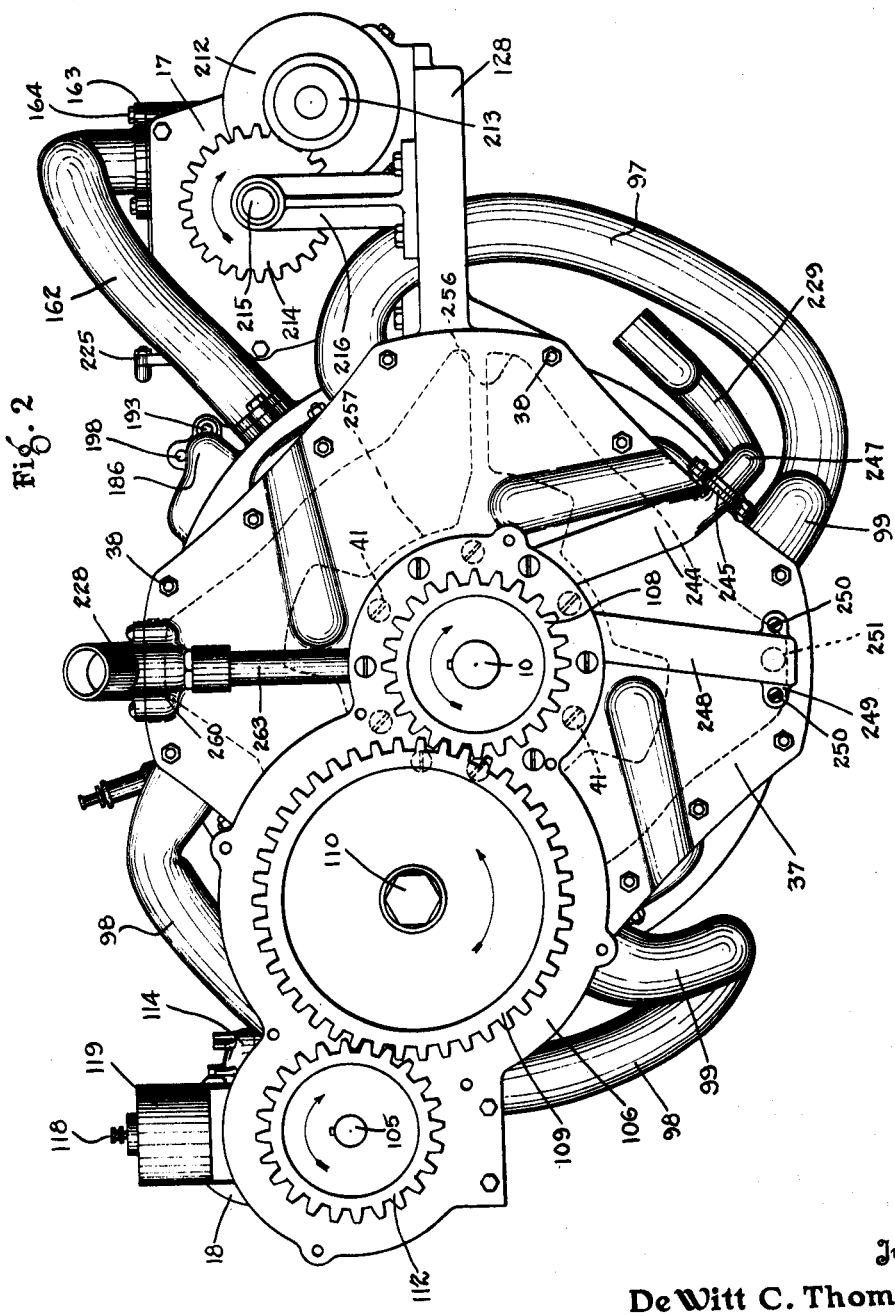

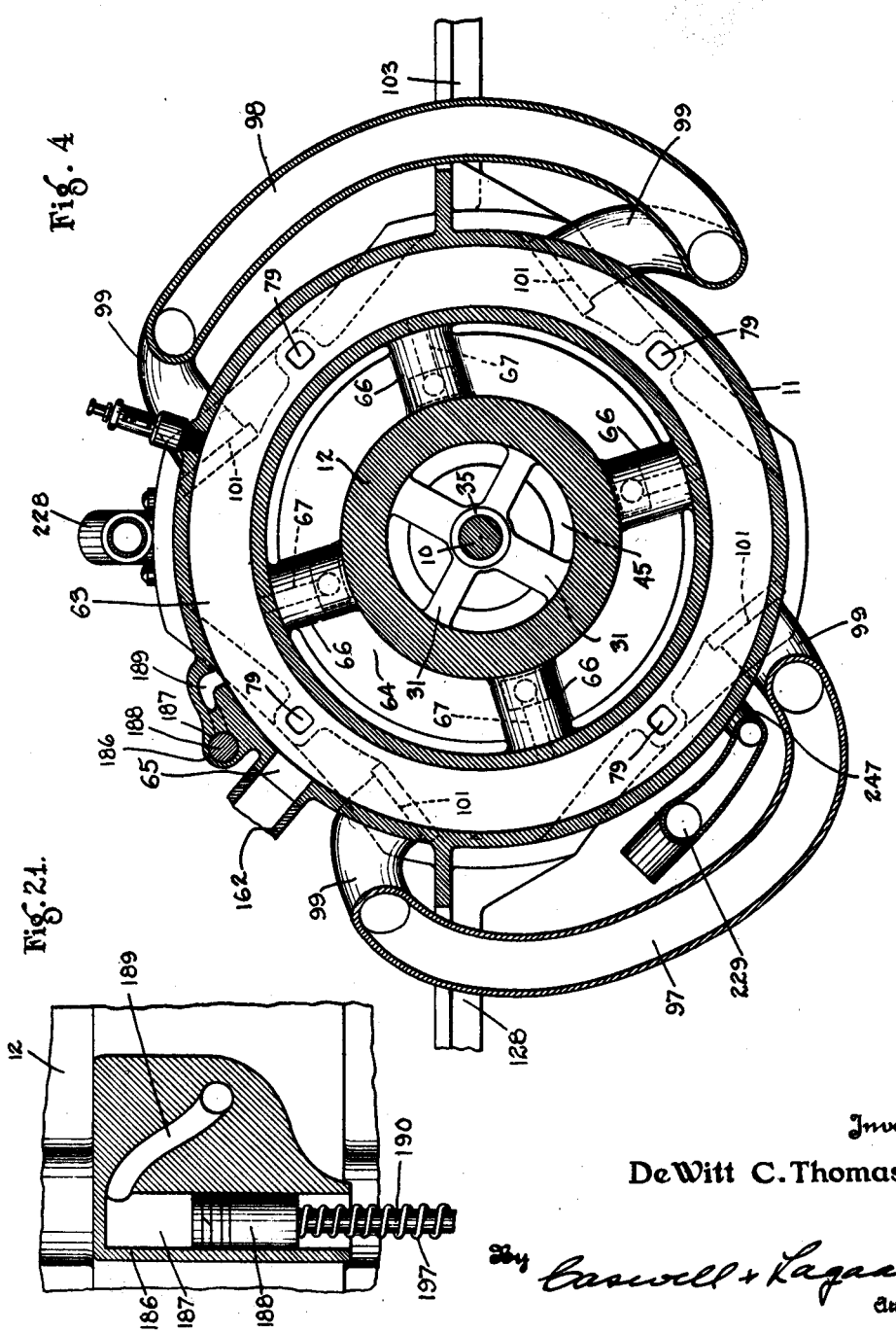

March 27, 1934. DE WITT C. THOMAS 1,952,149
ROTARY INTERNAL COMBUSTION ENGINE
Filed Jan. 15, 1930 10 Sheets-Sheet 5
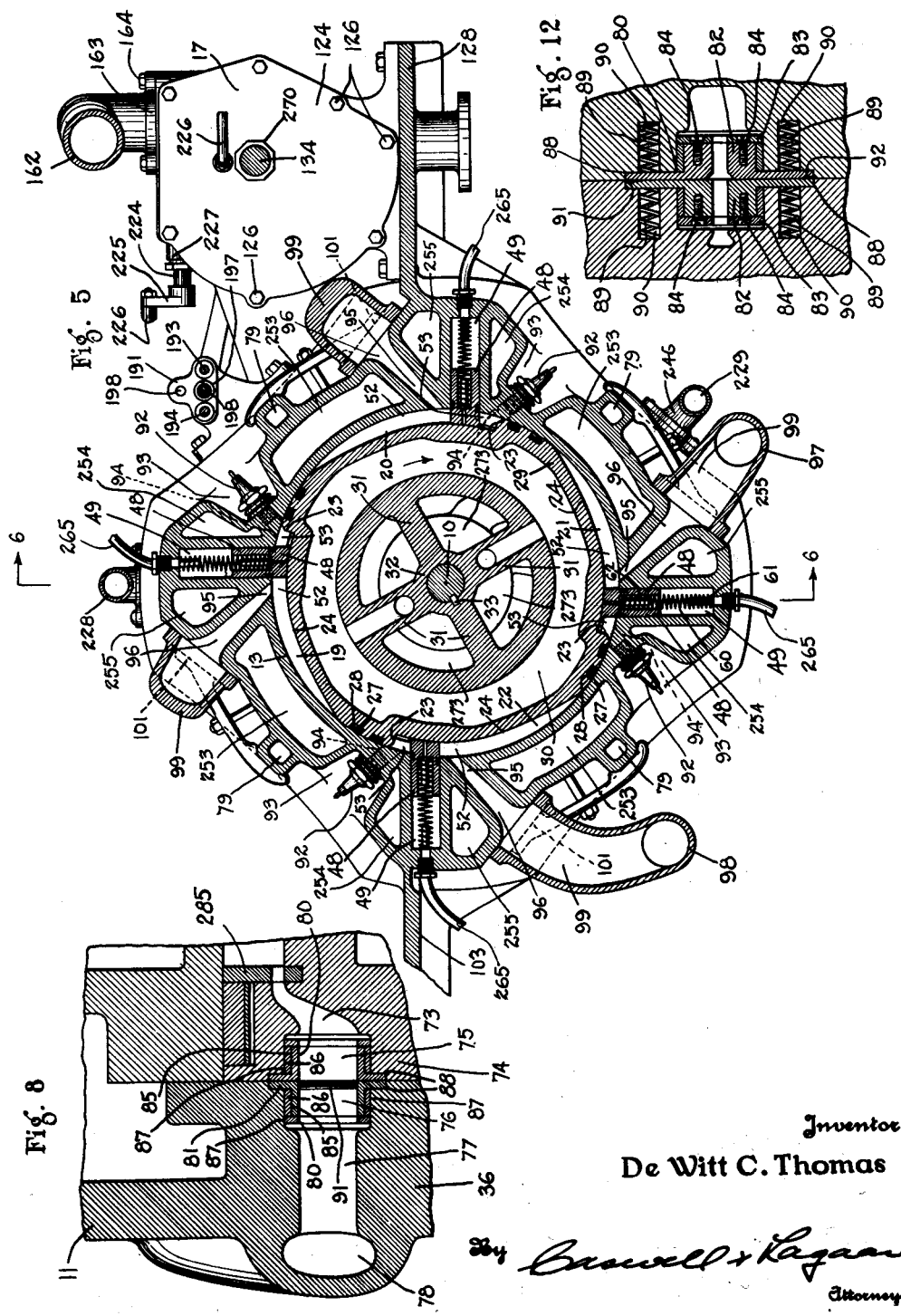
Inventor
De Witt C. Thomas

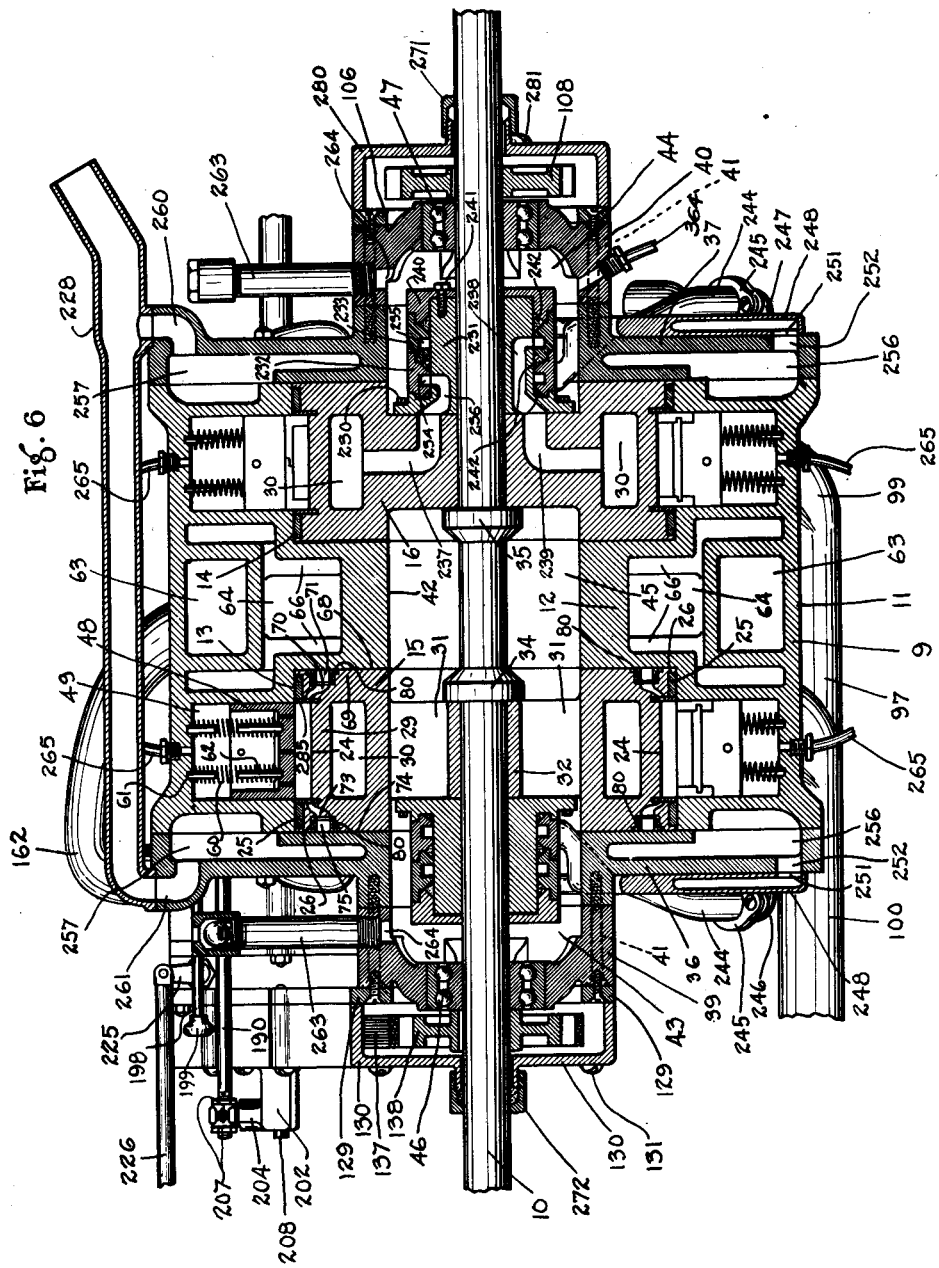

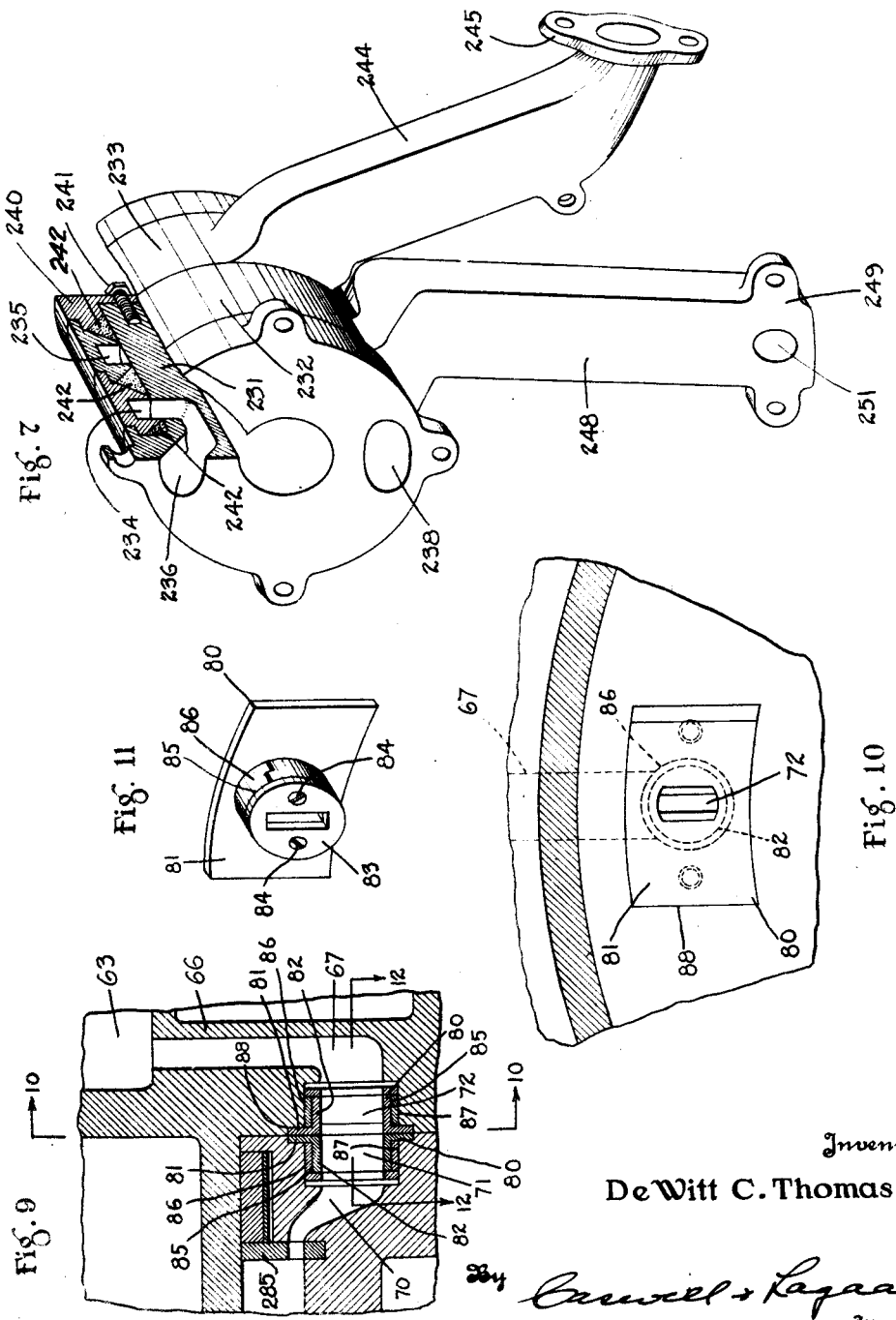

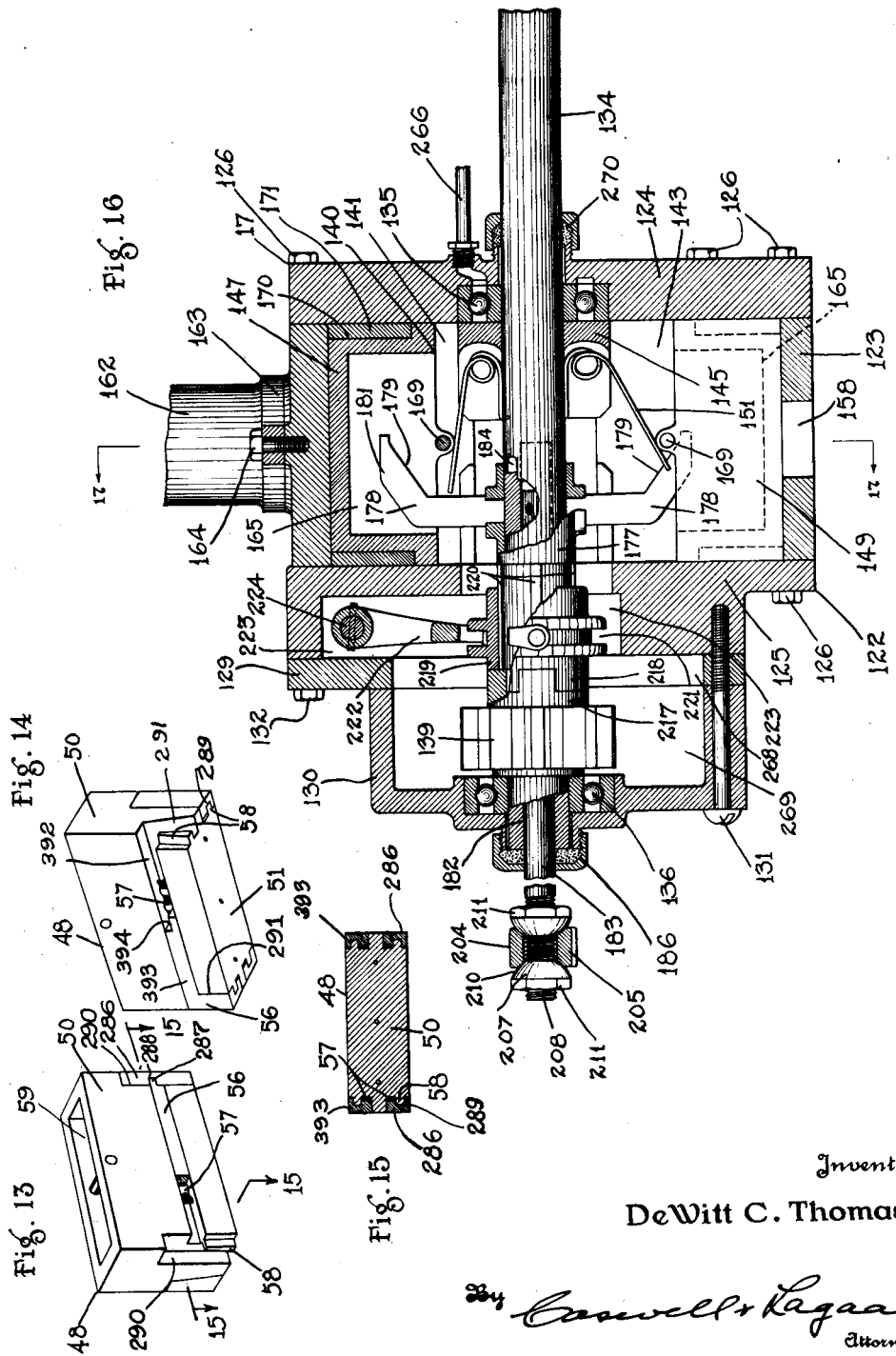

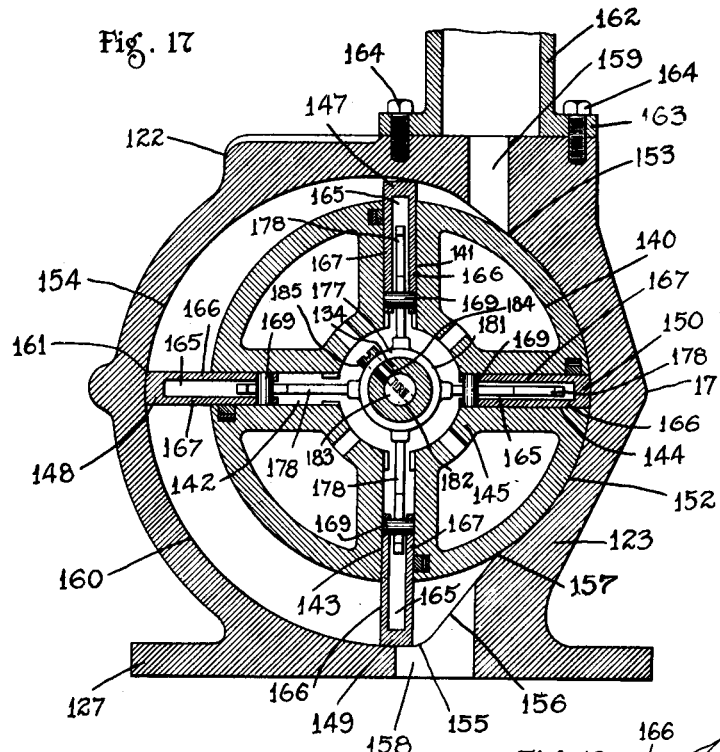

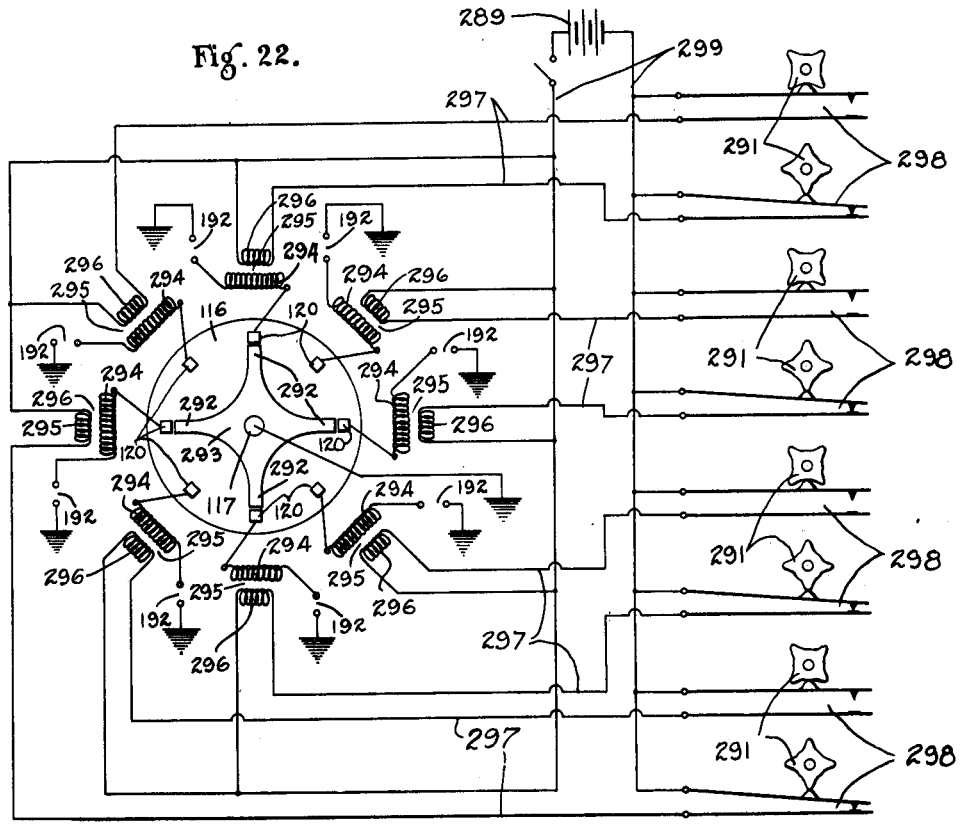

Patented Mar. 27, 1934

1,952,149

UNITED STATES PATENT OFFICE 1,952,149

ROTARY INTERNAL COMBUSTION ENGINE

De Witt C. Thomas, Austin, Minn.

Application January 15, 1930, Serial No. 420,961

13 Claims. (Cl. 123—14)

My invention relates to engines and particularly to internal combustion engines and has for its object to provide a rotary internal combustion engine without the use of pistons and cylinders.

An object of the invention resides in the provision of expansible pockets and in the furnishing of fuel mixture thereto, the exhaustion of burnt gas from said pockets, and in the lubrication and cooling of the rotary engine.

Another object of the invention resides in providing a rotary engine employing a cylindrical rotor having pockets formed on the periphery thereof, said pockets having spiral walls and radial walls connected therewith, and in further providing slidably mounted gates adapted to follow the walls of said pockets as the rotor rotates to form combustion and exhaust chambers within said pockets on opposite sides of said gates.

Another object of the invention resides in delivering a combustible fuel mixture under pressure to the chambers in said pockets formed between the gates and the radial walls of said pockets, in igniting said fuel mixture, and in further exhausting the chambers formed on the other sides of said gates.

A still further object resides in employing two spaced rotors and in constructing the stator with an annulus disposed between said rotors.

An object of the invention resides in constructing said annulus with a central oil chamber and in forming said rotors with oil chambers communicating with the stator oil chamber.

A feature of the invention resides in constructing the annulus with an annular intermediate water chamber, and said rotor with an annular water chamber following along said pockets, and in further providing means for bringing said water chambers into communication with one another.

Another object resides in feeding the cooling water first through said rotor and then through said stator to successively cool the same.

Another object of the invention resides in bringing the oil from said reservoir into said rotor from one side of said rotor, and in bringing the water for said rotor into said rotor from the other side thereof.

An object of the invention resides in arranging ports in the ends of said rotor and in the annulus of said stator, said rotor ports being connected to the pockets in the rotor, and said annulus ports being connected to said stator annular chamber.

A still further object of the invention resides in providing end plates for said stator, and in constructing further ports therein adapted to communicate with similar ports in the ends of said rotor and in further providing ducts connecting said outer annular stator chamber with said last named ports, the corresponding ports in said rotor being connected to the same pockets.

Another object of the invention resides in providing an adjustable compressor together with means responsive to changes in pressure for adjusting the capacity of the compressor to maintain a constant pressure within the gas chamber.

Other objects of the invention reside in the novel combination and arrangement of parts and in the details of construction hereinafter described and claimed.

In the drawings:

Fig. 1 is a plan view of an internal combustion engine illustrating an embodiment of my invention.

Fig. 2 is a side elevational view of my invention with the gear case removed to show the magneto drive.

Fig. 3 is a side elevational view similar to Fig. 2 taken of the reverse side of the engine with a portion of the gear case removed to illustrate the drive for the compressor.

Fig. 4 is an elevational sectional view taken on line 4—4 of Fig. 1.

Fig. 5 is an elevational sectional view taken on line 5—5 of Fig. 1.

Fig. 6 is an elevational sectional view taken on line 6—6 of Fig. 3.

Fig. 7 is a perspective view of the device for delivering the water to and from the rotor.

Fig. 8 is a fragmentary sectional view taken through the port structure of the end plate and rotor and drawn to a larger scale.

Fig. 9 is a view similar to Fig. 8 taken through the port structure of the stator annulus and the rotor port and drawn to a larger scale.

Fig. 10 is a sectional view taken on line 10—10 of Fig. 9.

Fig. 11 is a perspective view of one of the port facings shown in Figures 8 and 9.

Fig. 12 is a sectional view taken on line 12—12 of Fig. 9.

Fig. 13 is a perspective view of one of the gates used with my invention.

Fig. 14 is a perspective view of the reverse side of the structure shown in Fig. 13.

Fig. 15 is a plan sectional view taken on line 15—15 of Fig. 13.

Fig. 16 is a longitudinal elevational sectional view taken through the center of the compressor.

Fig. 17 is a cross sectional view of the compressor taken on line 17—17 of Fig. 16.

Fig. 18 is a perspective view of the compressor rotor removed from the case thereof.

Fig. 19 is a perspective view of one of the gates used with the compressor.

Fig. 20 is a sectional view taken on line 20—20 of Fig. 19.

Fig. 21 is a fragmentary plan sectional view taken through the shifter cylinder.

Fig. 22 is a wiring diagram of the ignition system.

Briefly stated, my invention comprises a stator 11 which includes a case 9 having an annulus 12, said case being bored at 13 and 14 to receive two rotors 15 and 16 mounted upon a shaft 10 rotatably supported in said stator. The shaft 10 drives a compressor 17 which furnishes proper fuel mixture to a number of expansible pockets formed in the rotor and through which the power is derived. In addition the shaft 10 operates a magneto 18 and an ignition timer 114 as well as an oil pump and water circulating pump not shown.

The two rotors 15 and 16 are identical in construction excepting that the same are disposed in obverse and reverse relation with respect to the annulus 12 of stator 11 for which reason only the rotor 15 will be described in detail. This device consists of a body portion which is substantially cylindrical in formation and which is best shown in detail in Figs. 5 and 6. In the outer periphery of the said rotor is formed a number of equally spaced pockets 19, 20, 21 and 22 which are constructed with substantially radial walls 23 and spiraled walls 24 commencing at the inner ends of the radial walls and extending up to the periphery of the said rotor. The rotor 15 fits snugly within the bore 13 of the stator case 9 and a tight joint is effected between the said rotor and stator through a number of sealing segments 25 similar to the piston rings used in reciprocating internal combustion engines which segments are retained in annular grooves 26 in the peripheral surface of the said rotor. These sealing segments are preferably constructed with transverse sealing strips 27 connected with the ends thereof and are seated in grooves 28 similar to the grooves 26 extending crosswise of the rotor in the peripheral surface thereof and communicating with the annular grooves 26. These sealing members are constructed with stepped joints as is customary with sealing rings thereby affecting a tight fit between the rotor and stator preventing leakage from any of the pockets 19, 20, 21 and 22. Within the rim portion of the rotor 15 which I have designated at 29 and in which the pockets 19, 20, 21 and 22 are located is provided a water chamber 30 which is annular in formation and follows the inner walls of the said pockets to cool the same as said walls become heated. A number of radial spokes 31 connect the rim 29 with a hub 32 which is secured to the shaft 10 by means of a key 33 (Fig. 5) leaving spaces 273 therebetween. Both the rotors 15 and 16 are held in proper longitudinal position upon the shaft 10 through collars 34 and 35 rigidly secured thereto.

The rotors 15 and 16 fit flush with the ends of the stator case 9. Upon the ends of said case both of which are open to receive the respective rotors 15 and 16 are placed end plates 36 and 37 which are bolted in place thereon, as best shown in Figs. 2 and 3, through a number of bolts 38. Attached to these end plates are caps 39 and 40 which are secured to said end plates through cap screws 41. The interior of the annulus 12 is internally bored as indicated at 42 to form a central chamber 45 while the end plates 36 and 37 and the caps 39 and 40 are similarly formed to provide chambers 43 and 44 at the ends of the engine for a purpose to be later explained. In the caps 39 and 40 are mounted ball bearings 46 and 47 which rotatably support the shaft 10 and with the two rotors 15 and 16 in proper position within the bores 13 and 14 of the stator case 9 and in proper position between the annulus 12 of the said case and the end plates 36 and 37.

In conjunction with each of the pockets 19, 20, 21 and 22 is employed a gate or follower 48 which is slidably mounted in a guide way 49 formed in the stator case 9. These guide ways are rectangular in form to fit said gates and are equally spaced and correspond in position with respect to the pockets 19, 20, 21 and 22.

The construction of one of the gates 48 is shown in detail in Figs. 13, 14 and 15. This device consists of a rectangular block 50 of a length equal to the width of the pockets 19, 20, 21 and 22 and of such dimensions as to snugly slide within the guides 49 in the stator case 9. The lower surface 51 of this block is curved to form a seat adapted to bear upon the spiraled surface 24 of the various pockets of rotors 15 and 16 and effects a tight closure between resilient side segments 285 mounted in said rotor on each side of said pocket and the bottom thereof dividing the said pockets into two compartments 52 and 53, the compartments 53 being between the radial walls of the pockets and the said gates. For preventing leakage past these gates, the following construction is employed. At two of the corners of the block are constructed vertical recesses 290 which are connected together through a horizontal recess 54 meeting said vertical recesses intermediate their ends. A sealing strip 286 is disposed in each of these recesses while a similar sealing strip 56 is disposed in the recess 54. This latter sealing strip is provided at its ends with tongues 287 which fit into grooves 288 of the strip 286 and form an expansible fluid tight connection therebetween. Tongues 58 formed on the block 50 and projecting into recesses 290 enter grooves 289 in the strips 286. These tongues serve to guide the strips 286 for movement against the walls of the guides 49 and against the spiraled walls 24 of the rotors. The other corners of the block 50 are constructed with vertical recesses 291 which are connected together at their upper ends through a horizontal recess 392. Two L-shaped sealing members 393 are disposed in these recesses which are formed with interlocking ends 394. Tongues 58 on the block 50 entering recesses 291 also fit into grooves 289 in the sealing members 393. All of the sealing members are forced outwardly through crinkled leaf springs 57 which are disposed in the various recesses and urge said sealing members against the walls of the structures along which the blocks slide. The block 50 is formed with a recess illustrated at 59 to receive two coil springs 60 which are seated in the bottom thereof and against the ends of the guide way 49. Pins 61 and 62 extend into the ends of these springs and serve to hold the same in place. By means of this construction the gate is held in close contact with the peripheral surface of the rotor to prevent leakage between the two chambers 52 and 53 so as to form an efficient device.

Within the annulus 12 of stator 11 and along the outer periphery thereof is formed an annular fluid chamber 63 into which the gaseous fuel mixture to be ignited within the engine is directed. The fuel mixture is compressed in the compressor 17 and delivered to the said chamber at the proper pressure so that as soon as the same enters the explosion chambers of the engine said fuel mixture may be ignited without further compression. This chamber is surrounded by an annular water chamber 64 which is disposed between the fluid chamber and the central chamber 45. An inlet 65 (Fig. 4) provides means for introducing the fuel mixture into the said chamber. Within the interior of the annulus 12 is disposed a number of spokes or radially extending portions 66 which are formed with passageways 67 extending radially inwardly toward the shaft 10 and terminating in ports indicated at 72 in Figs. 9 and 10. These ports are disposed in the end wall 68 of the said annulus adjoining the end 69 of the rotor 15 and in similar relation to the rotor 16. Passageways 70 in the rotor 15 which terminate in ports 71 communicate with the passageways 67 when said ports 71 come in registry with the ports 72 of the stator. The disposition of these ports is such that the said ports register when the rotor has assumed the position shown in Fig. 5 in which the chambers 53 between the gates 48 and the end walls 23 of the various pockets are of a capacity sufficient to receive the amount of compressed fuel mixture necessary for the desired explosion.

In addition to the passageways 70 for directing the fuel mixture into the combustion chambers, I employ passageways 73 similar to the passageways 70 which are disposed in the end wall 74 of the rotor 15 and which communicate with the various pockets 19, 20, 21 and 22 in close proximity to the radial walls 23 thereof the same as the passageways 70. These passageways terminate in ports 75 disposed in the end 74 of the said rotor in symmetrical position with respect to the ports 71, and are adapted to register with corresponding ports 76 (Fig. 8) formed in the end plate 36 of the stator 11. The ports 76 communicate through a short longitudinal passageway 77 in the said end plate with a number of radial passageways 78 which extend outwardly toward the periphery of the said end plates and stator. These radial passageways communicate through longitudinal bores 79 best shown in Fig. 5 with the annular chamber 63 which is charged with the fuel mixture.

By means of this construction the fuel mixture is supplied to the rotor 15 through both sides thereof in a manner to cause the rapid ingress of fuel mixture into the combustion chambers so as to increase the speed and efficiency of the engine. In addition the incoming fresh fuel mixture is directed toward the two spark plugs, as will presently become apparent to insure positive ignition of the fuel mixture. In identically the same manner the fuel is directed to the rotor 16, so as to cause the similar functioning of the said rotor. It might be here stated that the rotor 16 is disposed 45 degrees out of phase with the rotor 15 so that the said rotors will fire alternately as will be presently described to give a maximum number of impulses for each revolution. It is to be noted however that the ports and passageways in the stator are in identically the same position for both rotors.

For the purpose of preventing leakage of the gases past the ports 75—76 and the ports 71—72, these ports are formed with facings which are indicated in their entirety at 80. These facings are all similar in construction, and one of these facings, being that used with port 72, has been shown in detail in Figs. 10, 11 and 12. This facing consists of a plate-like member 81 formed with a circular boss 82 on the back thereof. To the rear of the boss 82 is attached a disk 83 which is secured to said boss through a number of screws 84. This disk is of a diameter slightly greater than the said boss so that the said disk and the plate 81 form an annular groove 85 for the reception of a sealing ring 86. The boss 82 and the disk 83 together with ring 86 are received within a bore 87 in the particular wall structure of the port of the rotor or stator with which the same is to be used which communicates with the particular passageway associated with the port wall. The plate 81 is received within a recess 88 constructed to snugly receive the same. In back of the plates 81 are provided compression springs 89 (Fig. 12) which are received within openings 90 in the wall structure of the stators and rotors, which springs bear against the said plates 81 to force the port facings 80 outwardly into contact with one another and with the opposing surfaces of the members with which the same come in contact. By means of this construction a perfect seal is formed between the various ports of the stators and rotors which automatically compensate for wear thereby preventing leakage of the fuel mixture and the consequential increase in efficiency of the engine. To permit of the facings passing each other as the rotors rotate, the edges of the said facings are beveled as indicated at 91 in Fig. 12. It is to be noted that the openings in the respective facings on the stator are substantially twice as wide as those in the rotor to insure the proper delivery of the fuel mixture to the combustion chambers.

The ports 72 and 76 which form the intake ports of the engine are disposed in advance of the various followers or gates 48 so as to conduct the fuel mixture into the chambers 53 formed between the said gates and the radial walls 23 of the various pockets. The various ports for fuel mixture are so positioned that shortly after the gates 48 drop down upon the spiraled surfaces 24 of the various pockets, said ports are brought into communication to direct the gas mixture into the chambers 53. This occurs when the volume of the said chambers is sufficient to receive enough fuel mixture to produce the desired impetus upon being ignited. It is to be noted that all of the chambers 53 of rotor 15 are charged at the same time and likewise all of the corresponding chambers of the rotor 16 are similarly charged at the same time but 45 degrees out of phase with the charging of the chambers of rotor 15. As soon as the various ports are closed to prevent the further entry of fuel mixture into the chambers 53, the explosive charges within the same are simultaneously ignited in all of the four pockets 19, 20, 21 and 22, by means of a number of spark plugs 92 which are disposed in suitable pockets 93 formed in the stator case 9 in advance of the gates 48 which pockets are constructed with openings 94 which communicate with the chambers 53. The spark plugs for each rotor are simultaneously fired through a device to be presently described in detail as soon as the intake ports are closed, causing the explosion of the gas mixture with each of said chambers and the rotation of the rotors in a clockwise direction as shown by the arrow in Fig. 5. As the rotors continue to rotate from the position shown in Fig. 5 the gates 48 follow along the spiraled surfaces 24 of the various pockets permitting the chambers 53 to expand and at the same time reducing the volume of the chambers 52.

As previously brought out the chambers 53 form the intake and explosion chambers of the motor while the chambers 52 form the exhaust chambers thereof. The exhaust is conducted from the engine through a number of exhaust ports 95 which communicate through substantially radial passageways 96 with two exhaust manifolds 97 and 98 which have branches 99 communicating with the various passageways 96 and which are constructed with outlets 100 which may be connected to a muffler or a suitable exhaust pipe not shown. The branches 99 of these various exhaust pipes may be constructed with flanges 101 which are adapted to be secured to the stator proper through crow foots or clamps 102 or any ordinary construction such as is now in common use for attaching exhaust manifolds to internal combustion engines. The ports 99 are positioned in close proximity to the gates 48 in back of the same and as close thereto as practical so as to permit of completely exhausting all of the burnt gases from the exhaust chambers.

In my improved engine I prefer to use a dual ignition system though it can be readily comprehended that the ordinary single system might be employed. In this system, I employ a magneto 18 which may be of usual construction and which is mounted upon a bracket 103 issuing outwardly from the stator case 9. Upon the said bracket is further mounted a charging generator 113 which is constructed with a shaft 105. The magneto 18 is constructed with a shaft 104 which extends outwardly beyond the same and which is directly coupled to the generator shaft 105. The magneto is driven through the shafts 104 and 105 from a system of gears best shown in Figs. 1, 2 and 6. Upon the cap 40 of stator 11 is secured a plate 106 which extends obliquely upwardly toward the magneto 18 and forms a bearing for one end of the shaft 105. Upon the main shaft 10 of the motor proper and on the exterior of the plate 106 is keyed a spur gear 108 which meshes with another spur gear 109 (Fig. 2) which is rotatably mounted upon a stud 110 screwed into a boss 111 formed on said plate. The gear 109 further meshes with another gear 112 which is keyed to the end of the shaft 105. The gears 112 and 108 have the same number of teeth so that as the shaft 10 rotates the shafts 104 and 105 rotate at the same rate of speed. By means of this construction the said shafts may be used for operating the timing device of the invention. A transmission case 280 is secured to the plate 106 through screws 281 and forms in conjunction with said plate a housing for the gears 108, 109 and 112 permitting of the lubrication thereof as will be presently described and protecting the same from dirt.

Where a dual ignition system is used in addition to the spark plugs 92 previously referred to, duplicate spark plugs 192 are employed which are positioned adjacent the spark plugs 92 at the opposite ends of the rotors 14 and 15 and which function to ignite the fuel mixture within the various chambers 53 in identically the same manner as the spark plugs 92.

In conjunction with the magneto 18, a timer 114 is employed which is driven from the shaft 104 through suitable gearing such as is ordinarily employed for such purposes which has not been shown in detail in this application. The common terminal from this timer is connected to the magneto 18 while the distributing terminals of the said timer are connected to the spark plugs 92 for both rotors 15 and 16.

In addition to the timer 114 another timer 116 is employed which is similarly driven from the shaft 105 of generator 113 through any suitable gearing such as now in common use for this purpose and which has not been shown in the drawings. The wiring for this timer is shown in Fig. 22. The timer 116 includes a high tension terminal 117, together with eight distributor contacts 120. A distributor arm 293 is formed with four branches 292 adapted to connect together alternate distributing contacts. In this system the various spark plugs 192 are each connected to the secondary 294 of individual spark coils 295 which secondaries are further connected to the respective contacts 120. The primaries 296 of these spark plugs are connected through suitable circuits 297 with individual make and break switches 298, each operated by its individual cam 291. The entire system is controlled through a circuit 299 energized from the storage battery 289 of the vehicle the same as in the other form of the invention. All the cams 291 are mounted upon the same shaft as the distributor arm 293 so as to be simultaneously rotatable therewith. In the operation of the distributor arm 293 alternately connects the spark plugs with the respective spark coils therefore so as to cause the pockets of each respective rotor to be fired simultaneously and to cause the rotors to be fired alternately. With this system a positive spark is provided for each spark plug so that there can be no danger of failure of the engine to operate. It is to be noted that the form of the invention shown in Fig. 22 is illustrated for only a single ignition system. It can however be readily comprehended that by doubling the parts of this system, dual ignition system may be produced or the magneto or the other type of ignition system such as previously described may be employed.

For the purpose of supplying fuel mixture under pressure to the combustion chambers of the engine, a type of air compressor is employed which is best shown in detail in Figs. 16 to 20 inclusive. This compressor comprises a stator 122 which is constructed with a case 123 open at both ends. The case 123 is closed by means of two end plates 124 and 125 which are bolted in place upon said case through bolts or cap screws 126. The case 123 is formed with a base 127 which is adapted to rest upon a bracket 128 issuing outwardly from the stator case 9 of the engine proper. Upon the end plate 125 is mounted a plate 129 similar to the plate 106 previously referred to, which is secured thereto through cap screws 132. This plate extends diagonally downwardly along the side of the motor proper as best shown in Fig. 3 and is attached to the cap 39 of the engine proper through countersunk machine screws 133. Upon the plate 129 is mounted a transmission case 130 which is secured to the said plate 129 through screws 131 and which forms a housing for the driving means for said compressor. The compressor shaft is designated at 134 and is journaled in a ball bearing 135 mounted in the end plate 124 and in a similar ball bearing 136 mounted in the transmission case 130. This shaft is driven from the engine shaft proper 10 through a chain 137 which passes over a sprocket wheel 138 keyed on the shaft 10 and another sprocket wheel 139 to be presently described in detail. Both of these sprockets and the said chain are housed within the housing formed by the plate 129 and the transmission case 130 so as to permit of the proper lubrication of the said chain and sprockets and so as to protect the said structure from dirt.

The rotor of the compressor 17 as best shown in Fig. 18 comprises a cylindrical body portion 140 formed with four diametrically opposed radial slots 141, 142, 143 and 144 extending completely through the said body member from end to end and to within a short distance of the center thereof to leave a central hub 145 at one end of the said rotor. The hub 145 is bored to fit upon the shaft 134 and is secured thereto through a key 146.

Within the radial slots 141, 142, 143 and 144 are slidably mounted a number of gates or followers 147, 148, 149 and 150 which are forced outwardly through said slots through springs 151 to engage the inner surface of the case 123. This case is constructed with a portion of the inner surface thereof designated at 152 contacting with the periphery of the body portion of the rotor 140 so as to effect a tight joint along the same. Starting at a point 153 the inner surface 154 of the said case spirals gradually outwardly to a point 161. From this point to a point 155 the surface of the said case indicated at 160 is concentric with the axis of the rotor 140 and spaced from the periphery thereof. From here on the surface 156 extends abruptly to the periphery of the rotor 140 at point 157. An inlet port 158 is formed in the case 123 along the surface 156 thereof while an outlet port 159 is formed in the upper portion of said case adjacent to point 153. The port 158 may be connected to a carburetor not shown in the drawings, while the port 159 is connected through a conduit 162 to the inlet 65 of chambers 63. This conduit may be constructed with flanges 163 which may be attached to the case 123 of the compressor 17 and to the stator 11 of the engine proper through cap screws such as indicated at 164 or by any other suitable means. As the compressor 17 operates, the gas of the compressor is delivered to the said chamber 63 where the same passes through the various ports and passageways in the engine proper as previously brought out.

The various gates or followers 147, 148, 149 and 150 are all constructed the same, and only the gate 147 has been shown in detail. This device consists of a plate or bar of metal which is hollowed out along the interior thereof to form a cavity 165 therein leaving two spaced side walls 166 and 167. These side walls are formed at their upper portions with ears 168 which are connected together by means of a pin 169 for a purpose to be presently described in detail. Along the lower and side edges of this plate are formed grooves 170 which receive sealing strips 171 which may be forced outwardly through crinkled leaf springs 172 to hold the said strips in contact with the walls of the end plates 124 and 125 against which the said gates abut. In addition to these sealing strips the ends of the body portion of the rotor 140 are constructed with grooves 173 in which are disposed sections 174 of sealing rings which further assist in the preventing leakage from the device.

In the operation of the compressor, carburetted air is drawn into the space between the gate 149 and the point 157 of the compressor as the rotor 140 travels in a clockwise direction as indicated by the arrow. As the rotor continues to rotate, the gas within the chamber 175 disposed between the gates 150 and 149 becomes compressed due to the following of the gate 150 along the inwardly spiraled surface 154 of the compressor. At the same time the compressed gas within the space 176 is being forced into the port 159 and the conduit 162 which commences as soon as the gate 147 passes the port 159. As each gate successively comes into operation a charge of gas is drawn into the compressor, compressed and discharged in the chamber 63 of the motor proper where the same is consumed by the engine as previously brought out.

In order to maintain a constant pressure within the chamber 63, the capacity of the compressor is varied by a mechanism best shown in Fig. 16. This mechanism includes a shifter 181 which comprises a hub 177 slidably mounted upon a portion of the shaft 134 within the case 123. This hub has attached to it a number of outwardly extending arms 178 corresponding in number to the slots 141, 142, 143 and 144. These arms extend into the cavities 165 in the various gates 147, 148, 149 and 150 and are constructed with tapered cam surfaces 179 adapted to engage the pins 169 secured to and extending across the walls 166 and 167 of the respective gates. These tapered cam surfaces 179 serve to limit the outward movement of the various gates through engagement with pins 169 thereof. Upon shifting the said shifter axially along shaft 134 the outward limit of movement of said gates may be varied as desired. When the shifter is in its extreme left hand position, the gates are permitted to follow the surfaces 160 and 154 of case 123 throughout their extent. When, however, the shifter is moved toward the right as viewed in Fig. 16 the outward movement of the various gates is limited so that the said gates are free from the surface 160 and do not strike the surface 154 until the said gates have traveled past the point 161. In such position a lesser amount of gas is drawn into the compressor and delivered therefrom thereby decreasing the capacity of the compressor. By means of this construction the capacity of the compressor may be reduced to give any desired amount of fuel mixture within the range of the device.

For shifting the shifter 181, one end of the shaft 134 is centrally and longitudinally bored as indicated at 182 to slidably support a shifter rod 183. This bore extends well past the shifter 181. Along the portion of the shaft 134 over which the shifter 181 travels is formed a longitudinal slot 184. A screw 185 (Fig. 17) extends through the hub 177 of the shifter and through the slot 184 and is threaded into the rod 183. This screw forms a connection between the said rod and shifter so that upon reciprocating the rod 183 longitudinally with respect to the shaft 134 the shifter 181 is correspondingly shifted.

The shifter 181 is automatically operated as follows: Formed on the stator 11 is a housing 186 which is internally bored at 187 (Fig. 21) to receive a piston 188 reciprocable therein. The bore 187 communicates through a passageway 189 with the annular gas chamber 63 in the annulus 12 of said stator. The piston 188 has connected to it a piston rod 190 which extends through a cross head 191 slidably mounted in a bracket 195 which is secured to the stator through bolts 196. The cross head 191 is slidably mounted on two guides 193 and 194 secured to the bracket 195 and has attached to it an operating rod 198 which may be formed with a suitable operating knob 199 on the end of the same for manipulating said rod. A set screw 200 screwed in the bracket 195 serves to hold the rod 198 in adjusted position. Surrounding the piston rod 190 is a compression coil spring 197 which is seated at one end against the cross head 191 and at its other end against the piston 188. This coil spring serves to force the piston inwardly into the bore 187. By varying the position of the cross head 191 through adjustment of the rod 198, the pressure applied to the piston 188 may be varied at will. Issuing outwardly from the transmission case 130 of the compressor 17 is a lug 202 which has pivoted to it through a stud 203 a rocker arm 204. This arm is forked at each of its ends as designated at 205 and 206 to straddle the ends of the piston rod 190 and the adjusting rod 183 of the compressor. The ends of both the rod 183 and the piston rod 190 are threaded at 208 and 209 to receive nuts 207 which are formed with curved faces 210 (Fig. 16) which are adapted to engage the forked ends 205 and 206 of the rocker arm 204. These nuts are held in adjusted position upon the rods 183 and 190 by means of lock nuts 211 screwed upon the threaded ends 208 and 209 of said rods. By means of this construction reciprocation of the rod 190 is imparted to the rod 183. As the pressure in the chamber 63 increases, the piston 188 is forced outwardly against the action of the spring 190. This causes the rod 183 to be forced inwardly and the shifter 181 to be moved so as to intercept the outward travel of the various gates 147, 148, 149 and 150 of rotor 140 of the compressor thereby reducing the capacity of the said compressor and regulating the pressure in the chamber 63. When the motor operates, the piston 188 functions to cause the compressor to at all times deliver the proper volume of fuel mixture to the engine so that no waste of power occurs in the operation of the compressor.

The outlet 159 of the compressor 17 is connected through the manifold 162 with the inlet 65 of chambers 63 as previously brought out. The inlet 158 of the compressor 17 is connected to a suitable carburetor not shown whereby carburetted air may be drawn into the said compressor and delivered to the chamber 63 from which the same is delivered into the various explosion chambers of the engine and subsequently ignited and expanded to produce the desired power. By employing the compressor for furnishing the explosive mixture to the explosion chambers the necessity of compressing the fuel mixture within said chambers is done away with so that immediately upon delivery of the explosive mixture into the said chambers the same may be fired in the customary manner. It can hence be readily comprehended that the engine may travel at a much higher rate of speed than would ordinarily be possible with the ordinary type of engine. Due to the number of explosions per revolution of the motor shaft, the engine may be also run at a much lower rate of speed than is possible with the ordinary internal combustion engines giving the motor an extremely wider range of speeds.

For starting the engine, a starting motor 212 is employed, which is mounted upon the bracket 128 adjacent the compressor 17. This motor is formed with an ordinary starting gear adapted to be automatically disconnected upon the engine gaining speed, which construction being well known in the art has not been disclosed in detail in this application. This device is enclosed within a case 213 attached to the end of the said starting motor 212 and is adapted to drive a gear 214 attached to the protruding end 215 of the compressor shaft 134. The shaft 134 besides being journaled in the bearings 135 and 136 in the compressor 17 is further journaled at the protruding end 215 thereof in a bearing 216 secured to the bracket 128 which may be a roller bearing.

The compressor 17 is driven from the engine shaft 10 through the chain 137 and the sprockets 138 and 139. The sprocket 139 is rotatably mounted upon the shaft 134 of the compressor 17 and is constructed with a clutch jaw 217. This jaw is adapted to engage a similar clutch jaw 218 formed on a sleeve 219 splined to the said shaft 134 through keys 220. The sleeve 219 is formed with a groove 221 which is engaged by a forked lever 222 disposed in a recess 223 formed with the cap 125. The lever 222 is attached to a shaft 224 which is journaled in the cap 125 and extends outwardly beyond the said cap and has attached to it an operating arm 225 (Fig. 3) which may be connected to an operating rod 226 for oscillating the same. As the rod 226 is manipulated the sleeve 219 is shifted to throw the jaws 217 and 218 into engagement with one another so as to effect a drive between the sprocket 139 and the shaft 134 or so as to disconnect said shaft from the driving means therefor. A stuffing box 227 surrounding the shaft 224 forms a tight connection between the said shaft and the compressor 17.

In the starting of the engine, the starting motor 212 is first energized. This causes the shaft 134 to be rotated through the starting gear and the gear 214 and builds up a pressure within the compressor 17. Due to the absence of pressure within the chamber 63 of the engine proper the piston 188 of the compressor control mechanism is in its innermost position within the bore 187 and the shifter 181 so disposed as to allow the various gates 147, 148, 149 and 150 to assume their outermost positions. The compressor hence operates at maximum capacity and the pressure within the chamber 63 rapidly builds up. As soon as the pressure within the chamber 63 is sufficient, the piston 188 is brought into action and the rocker arm 204 rocked to shift the shifter 181 and to cut down the output of the compressor. This reduces the load on the starting motor 212. If the clutch jaws 217 and 218 are now thrown into engagement through the operating rod 226, the shaft 10 of the engine proper will be driven from the shaft 134 through the sprockets 138 and 139 and the chain 137. This will charge the various explosion chambers of the engine with combustible gas and ignite the same at the proper intervals so as to cause the engine to function as previous.y brought out. As soon as the engine acquires sufficient speed, the starting motor is thrown out of driving relation with the gear 214 and the engine then operates independently to deliver power to the shaft 10.

For the purpose of cooling the engine, a water cooling system is employed which is best shown in Figs 1, 2, 3, 4, 5, 6, and 7. The water cooling system includes a water circulating pump and a radiator which are connected in the ordinary manner and function as is well known in the art. These devices have hence not been illustrated. The water is first led into the rotor water cooling chamber 30 from a manifold 229 and through a device shown in detail in Fig. 7 and from thereon passes through the stator water cooling chamber 64 and is finally discharged from the engine through a water manifold 228. Both of these manifolds as previously stated may be connected to the radiator and with the circulating pump of the engine in the circuit as is ordinarily customary. The interior of both of the rotors 15 and 16 as previously brought out is constructed with a hub 32 and an annular portion 29 connected therewith through spokes 31, said annular portion being formed with an annular chamber 30. The construction for draining the water into both of the rotors 15 and 16 being identical and that for rotor 16 being most clearly shown in Fig. 6 the following description will refer to the mechanism used in conjunction with said rotor.

To the end of the rotor 16 is bolted through bolts 230 a detachable hub 231. Upon this hub is mounted two rings 232 and 233 which are formed with annular grooves 234 and 235. The two rings 232 and 233 are held in place upon the hub 231 through a cap 240 which is bolted to the said hub through bolts 241. All of this construction is disposed within the chamber 44 formed within the end plate 37 and the cap 40 previously described. A passageway 236 in the hub 231 communicates with the groove 234 and also with a passageway 237 extending through one of the spokes 31 of the said rotor leading to the water chamber 30. A similar passageway 238 formed in the hub 231 diametrically opposite the passageway 236 communicates with a corresponding passageway 239 extending through one of the spokes 31 diametrically opposite the passageway 237. The said rings are sealed with respect to one another and the said hub to permit of the rotation of the said hub relative to said rings. This is accomplished through a number of sealing rings 242 which are preferably conical in formation and of a compressible substance. In Fig. 7 the ring structure 232—233 employed with rotor 16 has been shown in detail. As will be here noted the ring 233 has attached to it a conduit 244 which terminates in a coupling 245 by means of which the said conduit may be connected to the water inlet manifold 229 previously referred to. The said manifold 229 is formed with branches 246 and 247 which connect with both of the conduits 244 of both rotors 15 and 16 so that water is simultaneously delivered to both of the said rotors. The conduit 244 communicates with the groove 235 so that as the hub 231 rotates the conduit 244 is always in communication with the passageways 238 and 239. In a similar manner a conduit 248 is connected to the ring 232 which communicates with the groove 234 and thereby with the passageway 236 and 237. The conduit 248 terminates in a connection 249 by means of which the same may be bolted through screws 250 (Fig. 2) to the side of the engine where an opening 251 in the said conduit is brought into register with a corresponding opening 252 in the cap 37 of the stator proper. By means of this construction water is led from the inlet water manifold 229 simultaneously to both of the conduits 244 and to the grooves 235 of the rings 233. From here the water passes through the passageways 238 and through the passageways 239 of both the rotors and into the annular water cooling chambers 30 of said rotors. After the same has passed through said water cooling chambers, the water is conducted into the passageways 237 and 236, into the groove 234 and away from the rotors through the conduit 248 connected to ring 232 from which the same is directed to the stator proper.

The stator of the engine as previously brought out is constructed with an inner annular water chamber 64 which is disposed within the annulus 12 and which extends about the gas chamber 63. This water chamber also communicates with water chambers 253, 254 and 255 surrounding the explosion chambers of the two rotors 15 and 16 and the various gates operating in conjunction with the said rotors as well as the exhaust passageways and spark plugs of the engine. In each of the end plates 36 and 37 of the stator are water chambers 256 which extend about the lower halves of the same and which are in direct communication with the lowermost of the chambers 253, 254 and 255 of the stator proper. As water is discharged from the two conduits 248 through both rotors 15 and 16 into the chambers 256 the same passes from these chambers through the lower chambers 253, 254 and 255 and into the annular chamber 64. The water then circulates about this chamber until it reaches the upper portion thereof where the water passes out from the upper chambers 253, 254 and 255 and back into chambers 257 similar to the chambers 256 disposed at the upper halves of the end plates 36 and 37 and communicating with said upper chambers 253, 254 and 255. Chambers 257 are formed with water outlets 260 and 261 which are connected to the water outlet manifold 228 which as previously brought out is adapted to be connected to the radiator of the engine. In this manner the water is caused to circulate first through the rotors then through the lower portion of the engine stator and lastly through the upper portion of the engine stator where the same finally returns to the radiator. By such construction all of the parts of the engine are amply cooled and particularly the parts thereof surrounding the explosive chamber and the exhaust manifold so that the engine may be operated at the desired temperature to produce maximum efficiency.

Lubrication of the engine is taken care of partially automatically and partially by an oil pump not shown in the drawings which may be driven from any part of the engine. To the upper portions of each of the caps 39 and 40 of the stator 11 are attached breather pipes 263 which communicate through openings 264 with the chambers 43 and 44 in said end caps. The oil in entering these chambers flows about the water distributing rings 232 and 233 and through the spaces 273 between the spokes 31 of the two rotors and into the central chamber 45 in stator 11 previously referred to. This chamber serves as an oil reservoir for lubricating the entire engine. It can be readily comprehended that all of the contacting surfaces of the rotor and stator directly communicating with the chambers 43 and 44 and the chambers 273 of the rotors and the chamber 45 of the stator are automatically lubricated. Such structures include the end surfaces of the rotors, the water circulating rings, and the bearings for the shaft 10. To prevent leakage of the oil past the shaft 10, stuffing boxes 271 and 272 are employed which are attached to the transmission cases 130 and 280.

In addition to the means for automatically lubricating the internal parts of the engine as previously stated, an oil pump is employed which is connected to a tube 364 draining from the chamber 44 of the engine. Due to the fact that the bottom of this chamber is at the same elevation as the oil reservoir 45, the oil flows freely from the said reservoir and into the space 41 of rotor 16 and into the chamber 44 where the same may be conducted to the pump for distribution elsewhere. The oil pump has connected to the discharged outlet thereof a number of oil tubes 265 which communicate with the various guideways 49 disposed in the stator for guiding the gates 48. By means of this construction these gates are thoroughly lubricated so as to cause the same to function in the desired manner.

The compressor 17 is lubricated through an oil tube 266 which is connected to the end plate 124 thereof and which leads to the space between the two races of the ball bearing 135. Through this construction the oil passes into the said bearing through openings 267 in the hub 145 of rotor 141 where the same fills the interior of the said rotor lubricating the shifter 181 and the various gates 147, 148, 149 and 150. The oil further flows into the chamber 223 in which the clutch throw out lever 222 is disposed and flows out of the said chamber through an opening 268 in plate 129 and into the interior 269 of the transmission case 130. The oil then travels along the said case and drains back into the engine proper or into the bearing 46 and back to the reservoir 45. The chain 137 and the sprocket wheels 138 and 139 dip into the oil in the bottom of the case 130 and thereby lubricates the same and the sprocket wheels 138 and 139. In addition the oil is delivered by the said chain to the bearing 136. For preventing leakage of the oil past the said bearing, a stuffing box 186 is employed while leakage is prevented at the other end of the shaft 134 by means of another stuffing box 270. In a similar manner, oil is carried by the various gears 108, 109 and 112 up to the magneto shaft 105 which lubricates the said gears and the various bearing surfaces therefor including the stud 110. Oil is prevented from leaking out of the housing formed by the case 280 and plate 106 through a stuffing box 107 mounted on said plate. In this manner all of the movable parts of the engine are amply provided with oil so that friction between the same is greatly reduced resulting in a quiet and smoothly running engine.

The engine may be mounted upon the support or frame work to which it is to be attached through the two brackets 103 and 128 used for supporting the ignition system and compressor, or any suitable lugs or attaching members may be formed on the stator for this purpose.

My invention is highly advantageous in that an extremely flexible engine is provided which may be run at speeds considerably lower than possible with the ordinary internal combustion engines and likewise at speeds considerably higher than possible with ordinary internal combustion engines. The engine is extremely positive due to the dual system of ignition and due to the fact that the fuel mixture is delivered by a separate compressor at any desired pressure. By regulating the pressure responsive device it is possible to vary the pressure in the combustion chambers to meet with the requirements for any type of fuel and to correspond to different operating conditions. The impacts from the explosions occur at the outer periphery of the rotor thereby giving the maximum leverage for operating the engine. The combustion chambers are so constructed as to give a much greater degree of expansion than that heretofore possible with the ordinary internal combustion engines thereby increasing the efficiency and decreasing the fuel consumption. With my improved engine considerable less weight is required per horsepower than with the ordinary types of reciprocating internal combustion engines thereby making the engine particularly adaptable for airplane use. The engine produces a much more uniform torque and due to the explosion occurring simultaneously on opposite sides of the rotor a balanced torque is produced which relieves the bearings of considerable pressure. All of the moving parts being formed with sealing rings and similar devices the engine will operate for a considerable length of time without being effected by wear of the parts. The expansion of the gas during explosion with my invention may be greatly increased over what is possible with the ordinary internal combustion engine and may be as high as twice the compression, thereby greatly improving the operation of the engine and increasing the efficiency thereof so as to prevent loss of power.

Changes in the specific form of my invention, as herein disclosed may be made within the scope of what is claimed without departing from the spirit of my invention.

Having described my invention, what I claim as new and desire to protect by Letters Patent is 1. A rotary engine comprising a stator, a rotor revoluble therein and formed with pockets, a rectangular guideway formed in said stator, rectangular gates slidable along said guideway and into said pocket, said gates being formed with grooves at the longitudinal corners thereof, sealing strips slidable along said grooves and resilient means for urging said sealing strips outwardly along said grooves to force the same into the corners of the guideway to effect a fluid tight connection between said gate and guideway.

2. A rotary engine comprising a stator, a rotor revoluble therein and formed with pockets, a rectangular guideway formed in said stator, rectangular gates slidable along said guideway and into said pocket, said gates being formed with grooves at the longitudinal corners thereof, dovetailed sealing strips slidable along said grooves, resilient means for urging said sealing strips outwardly along said grooves to force the same into the corners of the guideway to effect a fluid tight connection between said gate and guideway, said gates having transverse grooves intersecting said first named grooves and complemental sealing members disposed in said second named grooves and cooperating with said first named sealing strips to further prevent the escape of fluid past the gate, and resilient means for urging said last named sealing members outwardly.

3. A rotary engine comprising a stator, a rotor revoluble therein and formed with a pocket, said stator and rotor having end walls contacting with one another, ports in said rotor and stator extending through the facing walls thereof, the port in said rotor communicating with said pocket, said ports being adapted to register with one another during the movement of the rotor within the stator, a facing comprising a boss disposed in one of said ports and having an opening therethrough and further comprising a plate recessed in the end wall containing said port, and resilient means engaging said plate for urging the facing outwardly from the end wall in which it is mounted.

4. A rotary engine comprising a stator, a rotor revoluble therein and formed with a pocket, said stator and rotor having end walls contacting with one another, ports in said rotor and stator extending through the facing walls thereof, the port in said rotor communicating with said pocket, said ports being adapted to register with one another during the movement of the rotor within the stator, a facing comprising a boss disposed in one of said ports and having an opening therethrough, said boss being formed with a groove having an expansible ring engaging the walls of the port to effect a fluid tight connection therebetween, said facing having a plate recessed in the end wall containing said port, and resilient means for engagement with said plate to urge the same outwardly from the end wall in which it is disposed.

5. A rotary engine comprising a stator, a rotor revoluble therein and having a pocket, said stator and rotor having end walls contacting with one another, ports in said rotor and stator extending through the facing walls thereof, the port in said rotor communicating with said pocket, said ports being adapted to register with one another during the movement of the rotor within the stator, a facing comprising a boss disposed in one of said ports and having an opening therethrough and further comprising a plate recessed in the end wall containing said port, said plate having extensions on either side of said boss and springs acting against the extensions of said plate for urging said facing outwardly and away from the end wall in which it is mounted.

6. In combination, two coaxial spaced rotors, a stator encircling said rotors, an annulus disposed between said rotors, means forming in conjunction with said stator and rotors expansible pockets, said rotors each having a water chamber and an oil chamber conductively disposed relative to one another, said annulus having at its center an oil chamber in communication with the oil chambers of said rotors, and further having an annular fuel chamber at its outer periphery medially disposed between said rotors, and communicating with said pockets, said annulus further having an annular water chamber conductively disposed with reference to the wall structure of the stator adjoining said rotors, and communicating with the water chambers of said rotors, said annular water chamber lying between the oil chamber of said annulus and the fuel chamber thereof and being conductively disposed with reference to both said oil chamber and fuel chamber whereby said stator, rotors and the oil in the oil chambers are all cooled through the water in said water chamber and whereby heat from the water is transferred to the fuel in the fuel chamber of the annulus.

7. A rotary engine comprising a stator, a cylindrical rotor revoluble within said stator, means forming in conjunction with said stator and the peripheral portion of said rotor, an expansible pocket, said rotor having a water chamber and an oil chamber conductively disposed relative to one another, means forming in said stator, a central chamber, an intermediate annular chamber and an outer annular chamber conductively disposed relative to one another, the oil chamber in said rotor being in communication with the central chamber of said stator, means for bringing the intermediate annular chamber of said stator into communication with the water chamber of said rotor, and means for bringing the outer annular chamber of said stator into communication with said pocket.

8. A rotary engine comprising a pair of spaced rotors, a stator encircling said rotors and having an annulus disposed between said rotors, means forming in conjunction with said stator and the peripheral portion of said rotors expansible pockets, said annulus having a central chamber, an intermediate annular chamber surrounding said central chamber conductively disposed relative to one another, and an outer annular chamber surrounding said intermediate annular chamber, each of said rotors having an oil chamber and a water chamber conductively disposed relative to one another, the oil chambers of both of said rotors being in communication with the central chamber of said stator, means for bringing said intermediate annular chamber of said stator into communication with the water chambers of both of said rotors, and means for bringing the outer annular chamber of said stator into communication with the pockets of both of said rotors.

9. A rotary engine comprising a stator, a rotor, means forming in conjunction with said stator and rotor an expansible fuel mixture pocket, a shaft driven by said rotor, means forming a fuel mixture chamber communicating with and feeding fuel mixture into said pocket, a compressor for delivering fuel mixture to said chamber, said compressor having a shaft independently rotatable with respect to said first named shaft, a starting motor for operating said compressor connected to said compressor shaft, said motor serving to build up pressure in said fuel mixture chamber, and transmission means for selectively driving said rotor shaft from said compressor shaft to independently bring the rotor up to speed, said transmission means operating to drive said compressor from the rotor after the engine is in operation.

10. A rotary engine comprising a stator, a rotor, means forming in conjunction with said stator and rotor, an expansible pocket, a shaft driven by said rotor, means forming a fuel chamber for feeding fuel into said pocket, a compressor for delivering fuel to said chamber, said compressor having a shaft operating independently of said rotor shaft, a starting motor adapted to be connected to said compressor shaft, and a clutch for connecting said compressor shaft with said rotor shaft to independently start the rotor.

11. A rotary engine comprising a stator, a rotor revoluble therein and formed with a pocket, a rectangular guideway formed in said stator, a rectangular gate slidable along said guideway and into said pocket, said gate being formed with grooves at the longitudinal corners thereof, and with lateral grooves at opposed faces thereof intersecting the first named grooves, and a plurality of L-shaped sealing strips, each of said strips having one leg in a longitudinal groove and its other leg in a transverse groove and lap jointed to the corresponding leg of its complemental sealing strip, and means for simultaneously urging each of said sealing strips in contact with two of the walls of the guideway.

12. A rotary engine comprising a stator, a rotor revoluble therein and formed with a pocket, a rectangular guideway formed in said stator, a rectangular gate slidable along said guideway and into said pocket, said gate being formed with grooves extending through contiguous walls of the gate at the longitudinal corners thereof, sealing strips in said grooves, and means for simultaneously urging each of said strips through two of the walls of the gate and against the contacting walls of the guideway.

13. A rotary engine comprising a stator, a rotor revoluble therein and having a pocket, said stator and rotor having end walls contacting with one another, ports in said rotor and stator extending through the facing walls thereof, the port in said rotor communicating with said pocket, said ports being adapted to register with one another during the movement of the rotor within the stator, a facing in each of said ports, said facings having openings therethrough and being adapted to contact with one another as the facing in the rotor passes the facing in the stator, and means for urging said facings outwardly toward one another, one of said facings having a beveled edge for engagement with the other facing to cause said facings to pass one another.

DE WITT C. THOMAS.